United States Patent
Vald et al.

(10) Patent No.: US 12,494,917 B1
(45) Date of Patent: Dec. 9, 2025

(54) PRIVACY-PRESERVING AUTHENTICATED KEY ROTATION

(71) Applicant: Intuit Inc., Mountain View, CA (US)

(72) Inventors: Margarita Vald, Tel-Aviv (IL); Olla Nasirov, Givatayim (IL); Adi Akavia, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/255,903

(22) Filed: Jun. 30, 2025

(51) Int. Cl.
*H04L 9/32* (2006.01)
*H04L 9/00* (2022.01)
*H04L 9/08* (2006.01)

(52) U.S. Cl.
CPC ............ *H04L 9/3242* (2013.01); *H04L 9/008* (2013.01); *H04L 9/085* (2013.01); *H04L 9/0891* (2013.01)

(58) Field of Classification Search
None
See application file for complete search history.

(56) References Cited

U.S. PATENT DOCUMENTS

| | | | | |
|---|---|---|---|---|
| 11,005,828 | B1 * | 5/2021 | Kapp | G06F 21/64 |
| 11,363,005 | B2 * | 6/2022 | Shockley | G06Q 20/401 |
| 2018/0019983 | A1 * | 1/2018 | Tissot | G06F 21/602 |
| 2021/0234684 | A1 * | 7/2021 | Maruyama | H04L 9/3013 |
| 2024/0005315 | A1 * | 1/2024 | Agunloye | H04L 9/085 |

OTHER PUBLICATIONS

Cohen et al., "HRA-Secure Homomorphic Lattice-Based Proxy Re-Encryption with Tight Security", IACR Communications in Cryptology, Apr. 2025, 36 Pages.
Wegman et al., "New Hash Functions and Their Use in Authentication and Set Equality", Journal of Computer and System Sciences, vol. 22, No. 3, Jun. 1981, 15 Pages.
Zach et al., "Using Proxy Re-Encryption for Secure Data Management in an Ambient Assisted Living Application", Open Identity Summit, 2015, 13 Pages.

* cited by examiner

*Primary Examiner* — Bassam A Noaman
(74) *Attorney, Agent, or Firm* — Dinsmore & Shohl LLP

(57) ABSTRACT

Certain aspects of the disclosure provide a method for performing data verification. The method includes generating a MAC by applying a tagging algorithm indicated by a shared verification key to a data item; appending the MAC to the data item; generating an encrypted dataset comprising an encrypted data item and encrypted message authentication; generating a re-encryption key based on a homomorphic secret key corresponding to the homomorphic public key and a new public key; generating a re-encrypted dataset comprising a re-encrypted data item and a re-encrypted MAC; transmitting the re-encrypted dataset to a first external system configured to perform data verification; receiving, from the first external system, an encrypted verification result based on the shared verification key; and taking an action based on receiving the verification result indicating that the data item is authentic.

19 Claims, 10 Drawing Sheets

PRIVACY-PRESERVING AUTHENTICATED KEY ROTATION

BACKGROUND

Field

Aspects of the present disclosure relate to cryptographic key rotation.

Description of Related Art

Cryptography refers to the practice of securing information through mathematical algorithms that transform readable data, such as plaintext, into unreadable data, such as ciphertext, to protect it from unauthorized access that may occur during storage, transmission, or processing of the data. Existing cryptographic systems rely on encryption and decryption processes that utilize cryptographic keys, which are specific pieces of information that control the cryptographic algorithm's operation. In symmetric cryptography, the same secret key is used for both encryption and decryption operations. In asymmetric cryptography, a pair of mathematically related keys is employed, including a public key that can be freely distributed for encryption purposes and a secret key that remains secret and is used for decryption purposes. The security of these cryptographic systems depends on the computational difficulty of deriving the decryption key without authorized access, typically relying on mathematical problems such as integer factorization or discrete logarithms that are believed to be computationally intractable for sufficiently large key sizes. Existing cryptographic implementations face ongoing challenges related to key management, computational efficiency, and cybersecurity vulnerabilities when plaintext data needs to be decrypted for verification.

SUMMARY

Certain aspects provide a method for performing data verification. The method includes generating a message authentication code (MAC) by applying a tagging algorithm indicated by a shared verification key to a data item, wherein the shared verification key is shared with a first external system; appending the MAC to the data item; generating an encrypted dataset comprising an encrypted data item and encrypted MAC by encrypting the data item and the MAC using a homomorphic public key; generating a re-encryption key based on a homomorphic secret key corresponding to the homomorphic public key and a new public key; generating a re-encrypted dataset comprising a re-encrypted data item and a re-encrypted MAC by re-encrypting the encrypted dataset using the re-encryption key; transmitting the re-encrypted dataset to a first external system configured to perform data verification; receiving, from the first external system, a verification result based on the shared verification key; and taking an action based on receiving the verification result indicating that the data item is authentic.

Certain aspects provide a method for performing homomorphic key rotation. The method includes receiving, from a client system, an encrypted dataset comprising: an encrypted data item and an encrypted MAC encrypted using a homomorphic public key, and a re-encryption key based on a homomorphic secret key corresponding to the homomorphic public key and a new public key; generating a re-encrypted dataset by re-encrypting the encrypted dataset using the re-encryption key; and transmitting the re-encrypted dataset to the client system.

Certain aspects provide a method for performing homomorphic MAC verification. The method includes identifying a request to authenticate a re-encrypted data item that has been encrypted with a new public key during a homomorphic re-encryption using a re-encryption key; receiving, from a client system, a re-encrypted dataset comprising the re-encrypted data item and a re-encrypted MAC, an evaluation key, and a shared verification key associated with an unencrypted version of the re-encrypted MAC; identifying a tagging algorithm indicated by the shared verification key; representing the tagging algorithm to one or more homomorphic operations; generating a new MAC by performing the one or more homomorphic operations on the re-encrypted data item using the evaluation key; generating a first verification result by comparing the new MAC with the re-encrypted MAC; and taking an action based on receiving the first verification result indicating that the re-encrypted data item is authentic.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

MAC Verification

MAC verification is a process by which a sender and receiver of a message can ensure that the message being transmitted is authentic and has not been compromised in any way. MAC verification relies on a shared key. The shared key is a cryptographic key that is known only to a sender and receiver of a particular message or data package. The shared key serves as the foundation of trust in a message authentication process between sender and receiver.

Figure 1:
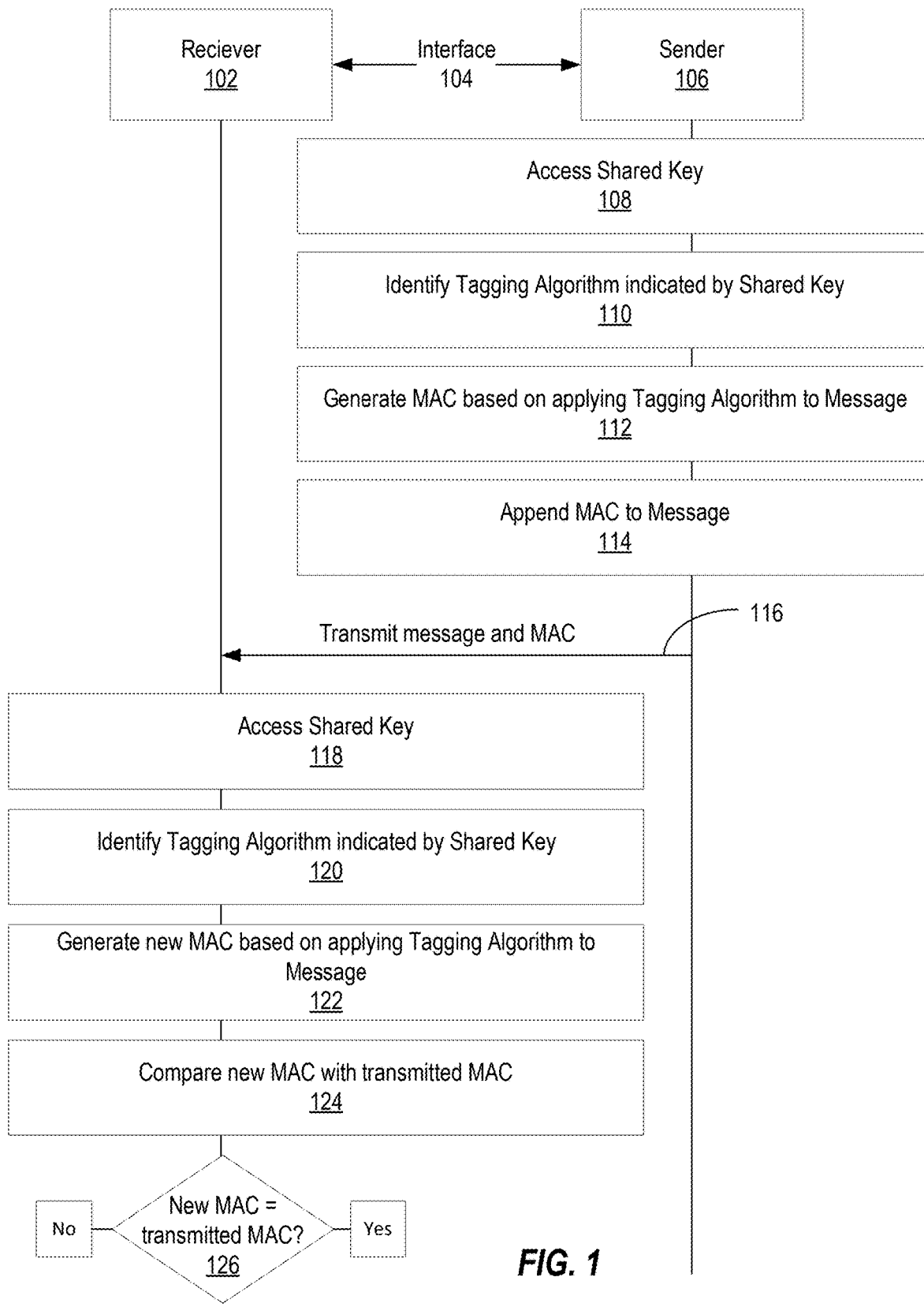
FIG. 1 depicts a process diagram for performing MAC verification.

FIG. 1 depicts a process diagram for performing MAC verification. FIG. 1 illustrates a receiver 102 in communication with a sender 106 via interface 104. In some aspects, interface 104 is a network that facilitates a communication connection between sender 106 and receiver 102. For example, when sender 106 sends a message or other data to the receiver 102, the receiver 102 will ensure that the received message is authentic. An authentic message is a message that has not been corrupted or altered during the transmission time after leaving the sender 106 but before being received by the receiver 102. The shared key can be used by sender 106 and/or the receiver 102 to verify the authenticity of the received message.

In particular, the shared key indicates a tagging algorithm that can be applied to the message to generate a MAC. The MAC is a verification tag on the data. In some aspects, the tagging algorithm is configured as a hash function. A hash function is a mathematical algorithm that takes input data of any size and produces a fixed-length output called a hash value. This hash value becomes the MAC. Some examples of hash functions used in message authentication verification processes include SHA-256, SHA-512, and SHA-3.

The sender will apply the hash function indicated in the shared key to the message it is sending to generate sender's MAC, and the receiver will apply the same hash function to the message it is receiving to generate the receiver's MAC. If the receiver's MAC matches the sender's MAC, then the receiver knows that the message is authentic and uncorrupted. If the receiver's MAC does not match the sender's MAC, the receiver knows that something has happened to the message during transit and that it should not trust the message.

Accordingly, at action 108, sender 106 accesses a shared key. At action 110, the sender 106 identifies the tagging algorithm indicated by the shared key. Next, at action 112, the sender 106 generates a MAC by applying the tagging algorithm to the message to generate a tag for the message. In some aspects, when the tagging algorithm is configured as a hash function, the hash function converts the message to a fixed-length hash value. This fixed-length hash value may be used as the MAC. The MAC is appended to the message at action 114.

After appending the MAC to the message, the MAC and the message are transmitted to the receiver 102 at action 116. At this point, the receiver 102 will verify the authenticity of the message prior to using the message in any downstream actions. The receiver 102 accesses the shared key at action 118, which is the same shared key accessed by sender 106 at action 108. At action 120, the receiver 102 identifies the tagging algorithm indicated by the shared key. Next, at action 122, the receiver 102 applies the tagging algorithm to the message to generate the new MAC.

At action 124, the receiver 102 compares the new MAC generated at receiver 102 with the MAC transmitted by the sender 106 along with the message at action 116. At action 126, the receiver 102 determines whether the new MAC matches the transmitted MAC. If the codes match, then the message is authentic. If the codes do not match, the message is not authentic.

If the message is authentic, the receiver 102 can use the message in any downstream processing or take any further actions using the message. However, if the message is not authentic, the receiver 102 will flag the message, discard it, and/or may request that a new copy of the message be transmitted. Additionally, the sender 106 and/or receiver 102 can take further action to determine the cause of the cybersecurity breach that resulted in the receiver 102 receiving a corrupted or counterfeit message.

While the MAC verification process allows the receiver to ensure that the message it has received is authentic, the MAC verification process still experiences some cybersecurity vulnerabilities, such as related to the MAC. For example, in currently available MAC processes, the MAC is transmitted without encryption. If an attacker were able to intercept the message and appended MAC, the attacker may be able to access the MAC and append it to malicious messages. Attackers may also be able to extract information about the hash function that was used to generate the MAC, allowing them to recreate the MAC for any messages.

As described above, the verification process relies on the shared key remaining secret between the sender and receiver of the message being verified. Thus, several cybersecurity vulnerabilities involve key management, including shared key compromise and static key usage. In an initial transaction, the shared key must be generated and shared between the sender and receiver. If an attacker obtains the shared key, the attacker would be able to generate valid MACs for malicious messages causing the shared key to become compromised. Existing verification processes utilize a static shared key for extended periods of time, which further increases the risk of the key becoming compromised.

Notably, the MAC verification, as illustrated in FIG. 1, can also be applied to encrypted messages. In conventional systems, the sender 106 will identify the message to transmit, encrypt the message with a public key, and apply the hash function in the shared key to the encrypted message to generate the MAC. Prior to transmitting the encrypted message to the receiver 102, the sender 106 will append the MAC to the encrypted message. However, many of the aforementioned technical problems still exist with MAC verification of encrypted messages.

This is because traditional encryption schemes require that the encrypted data be decrypted before performing any meaningful operations on it, for example, generating a new MAC. Further, even in instances where the message remains encrypted, the MAC is not encrypted, or must be decrypted after encryption, to be verified. This decryption step may expose the data to cybersecurity attacks.

Fully Homomorphic Encryption

One example technique that attempts to mitigate data exposure problems with decryption is fully homomorphic encryption (FHE). FHE is a cryptographic technique that allows computations to be performed directly on encrypted data without every decrypting it. This means that a user or system can process, analyze, and manipulate data while it remains completely encrypted throughout the entire operation. When operations are performed on FHE-encrypted data, the results are also encrypted. When the encrypted results are decrypted, the decrypted results will match the results that would have been generated if those same operations had been performed on unencrypted or plaintext data.

The mathematical foundation of FHE relies on special algebraic structures, such as lattice-based cryptography. FHE supports addition, subtraction, and multiplication operations on ciphertexts. Multiple operations may be combined to represent more complex operations, such as polynomial computations. For example, given encrypted values $E(a)$ and $E(b)$, then $E(a) \oplus E(b) = E(a+b)$ and $E(a) \otimes E(b) = E(a \times b)$, where $\oplus$ and $\otimes$ represent the homomorphic operations. In some instances, the security of FHE relies on mathematical problems like Learning with Errors (LWE) or Ring Learning with Errors (RLWE), which are highly resistant to adversarial attacks.

Figure 2:
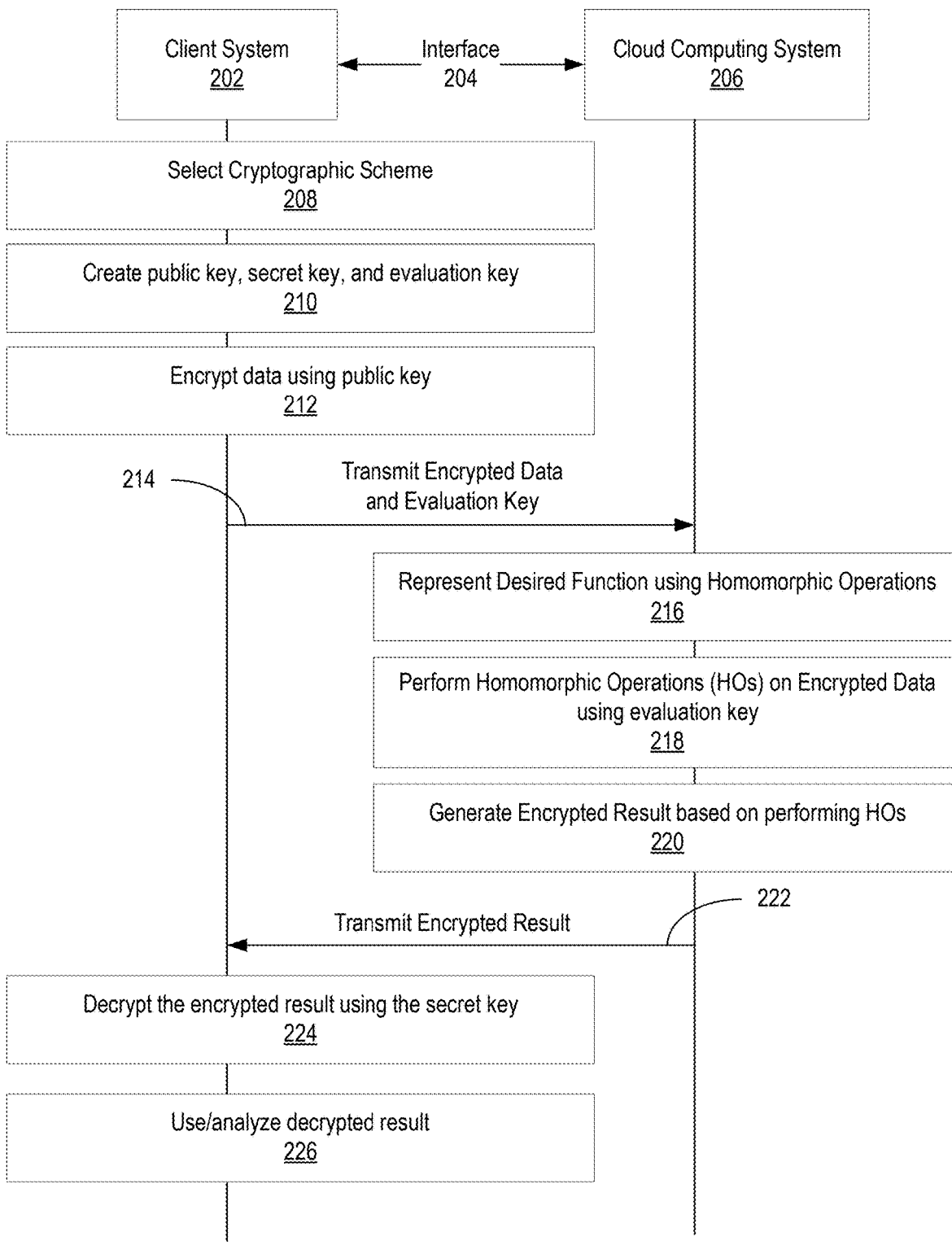
FIG. 2 depicts a process diagram for performing an example of a fully homomorphic encryption process.

FIG. 2 depicts a process diagram for performing an example of an FHE process. FIG. 2 depicts client system 202 in communication with cloud computing system 206, via interface 204. At action 208, the client selects the cryptographic scheme that will be used in performing the FHE process. A cryptographic scheme is a structured set of algorithms, protocols, and/or procedures that work together to achieve specific security objectives. In some aspects, the cryptographic scheme is associated with a specific range of numbers that are used to represent data packets during the encryption/decryption process. At action 210, the client system 202 creates a public key, a secret key, and an evaluation key that will be used during the FHE process. Next, at action 212, client system 202 encrypts the data using the public key. In some aspects, another system in communication with client system 202 encrypts the data using the public key.

In some aspects, client system 202 then transmits the encrypted data and evaluation key to an external system, such as cloud computing system 206, at action 214. Cloud computing system 206 may be a third-party SAAS platform configured to perform one or more operations on the encrypted data using FHE. In some aspects, client system 202 may perform the actions depicted as part of cloud computing system 206. Alternatively, client system 202 may share a shared storage with the cloud computing system 206. As shown in FIG. 2, the cloud computing system 206 is configured to represent one or more desired functions using homomorphic operations, for example, at action 216. Some examples of functions that may be performed homomorphically include analytics, such as averages and sums, machine learning evaluation and training models. In some instances, homomorphic functions may include facilitating decision trees, implementations with neural networks, or regression problem applications. The cloud computing system 206 may then perform the homomorphic operations on the encrypted data using the evaluation key at action 218. At action 220, the cloud computing system 206 generates the encrypted result based on performing the homomorphic operations. By performing the homomorphic operations on the encrypted data, it is as if the cloud computing system 206 performed the original function on the encrypted data. The results of the homomorphic operations are also encrypted. Beneficially, the cloud computing system 206 never has access to the plaintext of the data or the plaintext of the results, thereby protecting the underlying data from exposure to cybersecurity attacks or malicious uses by the cloud computing system 206 or other system that can access the cloud computing system 206.

Thus, cloud computing system 206 transmits the encrypted result 222 to client system 202. At action 224, client system 202 is then able to decrypt the encrypted result using the secret key. Because the decrypted result generated from the FHE process is the same result that would have been generated from performing the desired function on the plaintext data, the client system 202 is able to use and analyze the decrypted result without further processing, for example, at action 226.

Cryptographic Key Rotation

In addition to MAC verification processes, another example of a cybersecurity process that suffers from similar data exposure problems is during cryptographic key rotation. Key rotation is the practice of systematically replacing cryptographic keys with new keys at regular intervals or when security events occur that may have compromised the old keys. Time-based rotation occurs on predetermined schedules, depending on the key's criticality and usage patterns. Event-driven rotation happens in response to specific triggers like suspected compromise, employee departures, security incidents, or system breaches. Usage-based rotation replaces keys after the keys have been used a certain number of times or processed a specific amount of data.

When performing a key rotation, an old key is used to decrypt the encrypted data. The system generates a new key that is then used to re-encrypt the data. However, there is exposure window between the time that the data is decrypted and when the data is re-encrypted that may expose the plaintext data to cybersecurity attacks or malicious uses. As another example of a technical problem of key rotation may occur during the decryption and/or encryption process itself. For example, in the decryption process using the old key or re-encryption process with the new key, the data may become corrupted due to a flawed decryption or encryption scheme. However, once the data is re-encrypted, there is no way to verify that the data has not become corrupted, either from a cybersecurity event or flawed internal decryption/encryption process, without decrypting the newly re-encrypted data, thereby further exposing the plaintext data to cybersecurity attacks.

Privacy-Preserving Authenticated Key Rotation

Accordingly, aspects of the disclosed systems and methods described herein beneficially overcome technical problems associated with cryptographic key rotation. In particular, the systems and methods described herein are directed to a privacy-preserving authenticated key rotation.

In some aspects, the privacy-preserving authenticated key rotation is directed to systems and methods for performing a homomorphic key rotation with a homomorphic MAC verification. In some aspects, the privacy-preserving authenticated key rotation is accomplished through a multi-stage process. For example, in some aspects, a first operation of privacy-preserving authenticated key rotation includes initializing the data that is desired to be encrypted, key-rotated, and then verified. The initialization operation is described in more detail in FIG. 4. In some aspects, a second operation includes a homomorphic key rotation, which is described in more detail in FIG. 5. In some aspects, a third operation implements a homomorphic MAC verification, which is described in more detail in FIG. 6.

The privacy-preserving authenticated key rotation methods disclosed herein are privacy-preserving because underlying plaintext data is never exposed to third-party systems.

Additionally, the privacy-preserving authenticated key rotation methods disclosed herein are authenticated because the data that has been re-encrypted with the new key, as part of the key rotation, can be verified as being authentic and uncorrupted, also without exposing the underlying data. Thus, aspects of the privacy-preserving authenticated key rotation methods described herein beneficially overcome technical problems associated with existing key rotation techniques, including providing a way to authenticate the data after a key rotation is performed, while also preventing cybersecurity vulnerabilities that arise during the exposure window between the decryption using the old key and the re-encryption using the new key. Further, the disclosed aspects herein overcome the technical problem of the inability of existing systems and methods to identify data corruption that may occur during the decryption or encryption processes themselves. Beneficially, disclosed aspects of the privacy-preserving authenticated key rotation methods disclosed herein allow for users and systems to authenticate data after it has undergone a key rotation, in order to verify that no corruption event has occurred, either by a third party, or by the internal system performing the key rotation. The disclosed aspects herein also overcome the technical problem of exposing plaintext data by conventional systems by allowing for the key rotation and the data verification post-key rotation to be performed without decrypting the encrypted or re-encrypted data, thereby preventing exposure of the underlying plaintext data.

Figure 3:
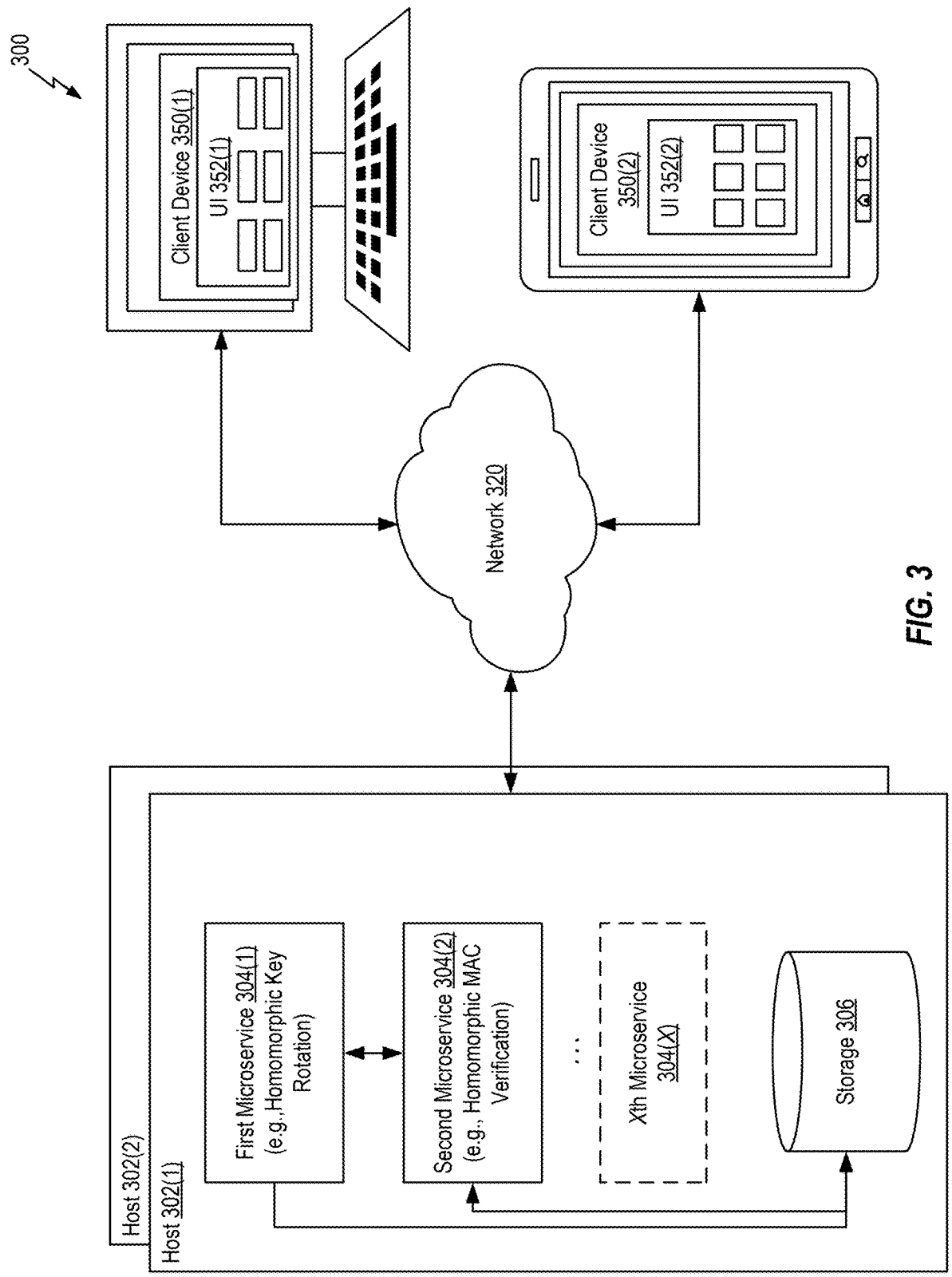
FIG. 3 depicts an example system supporting a plurality of the microservices.

Example System Implementing a Homomorphic MAC Verification Service with a Homomorphic Key Rotation Service FIG. 3 depicts an example system 300 supporting a plurality of the microservices 304 (e.g., software-defined services, which in some cases, may be cloud-native). As shown in FIG. 3, system 300 includes client devices 350(1)-(2) (collectively referred to herein as "client devices 350") and hosts 302(1)-(2) (collectively referred to herein as "hosts 302") interconnected through a network 320. Network 320 may be, for example, a direct link, a local area network (LAN), a wide area network (WAN), such as the Internet, another type of network, or a combination of one or more of these networks.

Hosts 302 may be geographically co-located servers on the same rack or on different racks in any arbitrary location in a data center. Hosts 302 may be constructed on a server grade hardware platform and include components of a computing device such as, one or more processors (central processing units (CPUs)), one or more memories (random access memory (RAM)), one or more network interfaces (e.g., physical network interfaces (PNICs)), storage 306, and other components (e.g., only storage 306 is shown in FIG. 3).

A first host 302(1) in system 300 may host a plurality of microservices 304(1)-(X) (collectively referred to herein as "microservices 304"), where X is an integer greater than one. The microservices 304 may be deployed using virtual machines (VMs) and/or container(s) running on first host 102(1) (e.g., where first host 302(1) is running a hypervisor (not shown) used to abstract processor, memory, storage, and networking resources of first host 302(1)'s hardware platform). Generally, microservices 304 are loosely coupled and independently deployable services (or software) that may make up an application. Microservices 304 may enable segmented, granular level functionalities within a larger system infrastructure.

Client device 350(1) and client device 350(2) may each include a user interface (UI) 352(1), 352(2), respectively, which may be used to communicate with, at least, a first microservice 304(1) and/or another of the microservices 304, through the X-th microservice 304(X) using the network 320. For example, communication between client devices 350 and at least one of the microservices 304 may be facilitated by one or more application programming interfaces (APIs). Examples of client devices 350 may include a smartphone, a personal computer, a tablet, a laptop computer, and/or other devices.

As shown in FIG. 3, in certain aspects, the first microservice 304(1) implements a homomorphic key rotation service. The homomorphic key rotation service performs a key rotation using a fully homomorphic encryption process. In certain aspects, the second microservice 304(2) implements a homomorphic MAC verification service according to the aspects described herein. The homomorphic MAC verification service may be used to verify the authenticity of data after performing homomorphic key rotation using the homomorphic key rotation service.

Though FIG. 3 depicts each of first host 302(1), storage 306, client device 350(1), and client device 350(2) as single devices for case of illustration, first host 302(1), storage 306, client device 350(1), and/or client device 350(2) may be embodied in different forms for different implementations. Further, though FIG. 3 depicts only two of the hosts 302 and two of the client devices 350, other examples may include more or fewer of the hosts 302 and/or client devices 350, and client devices 350 may use any combination of microservices 304 on any of hosts 302 where microservices 304 are deployed.

Initializing a Set of Homomorphic Keys

Figure 4:
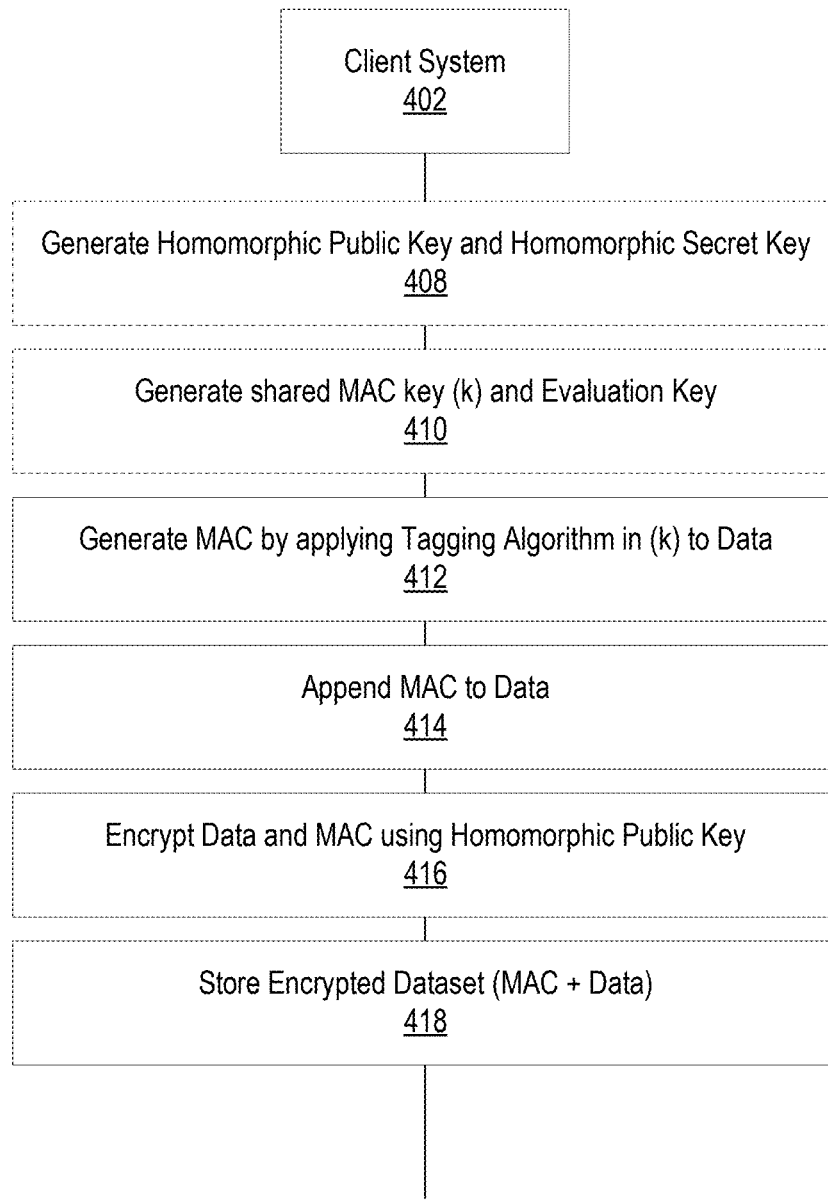
FIG. 4 depicts an initialization operation associated with the privacy-preserving authenticated key rotation.

As mentioned above, FIG. 4 depicts an initialization operation associated with the privacy-preserving authenticated key rotation described herein. In particular, FIG. 4 depicts a client system 402 that is configured to perform various actions. The initialization operation is focused on generating a set of homomorphic keys that can be used to encrypt data, a shared MAC key to be used in the verification process, and an evaluation key to be used as part of performing the homomorphic key rotation.

As shown in FIG. 4, at action 408, client system 402 generates the homomorphic public key and the homomorphic secret key, which make up the set of homomorphic keys that can be used to homomorphically encrypt and decrypt data. The homomorphic public key is used to encrypt plaintext data, while the homomorphic secret key is used to decrypt the encrypted data.

At action 410, the client system also generates the shared MAC key and the evaluation key.

At action 412, the client system 402 generates a MAC by applying a tagging algorithm to the data, wherein the tagging algorithm to use is indicated by the shared MAC key. A tagging algorithm is algorithm that can be applied to a data item in order to generate a tag that is unique for that data item. By verifying the tag, a user or system is able to verify that the data item is authentic.

At action 414, the client system 402 then appends the MAC to the data.

At action 416, the client system 402 encrypts the data and the MAC using the homomorphic public key to generate an encrypted dataset comprising the encrypted data and the encrypted MAC.

At action 418, the client system 402 stores the encrypted dataset.

Homomorphic Key Rotation

Figure 5:
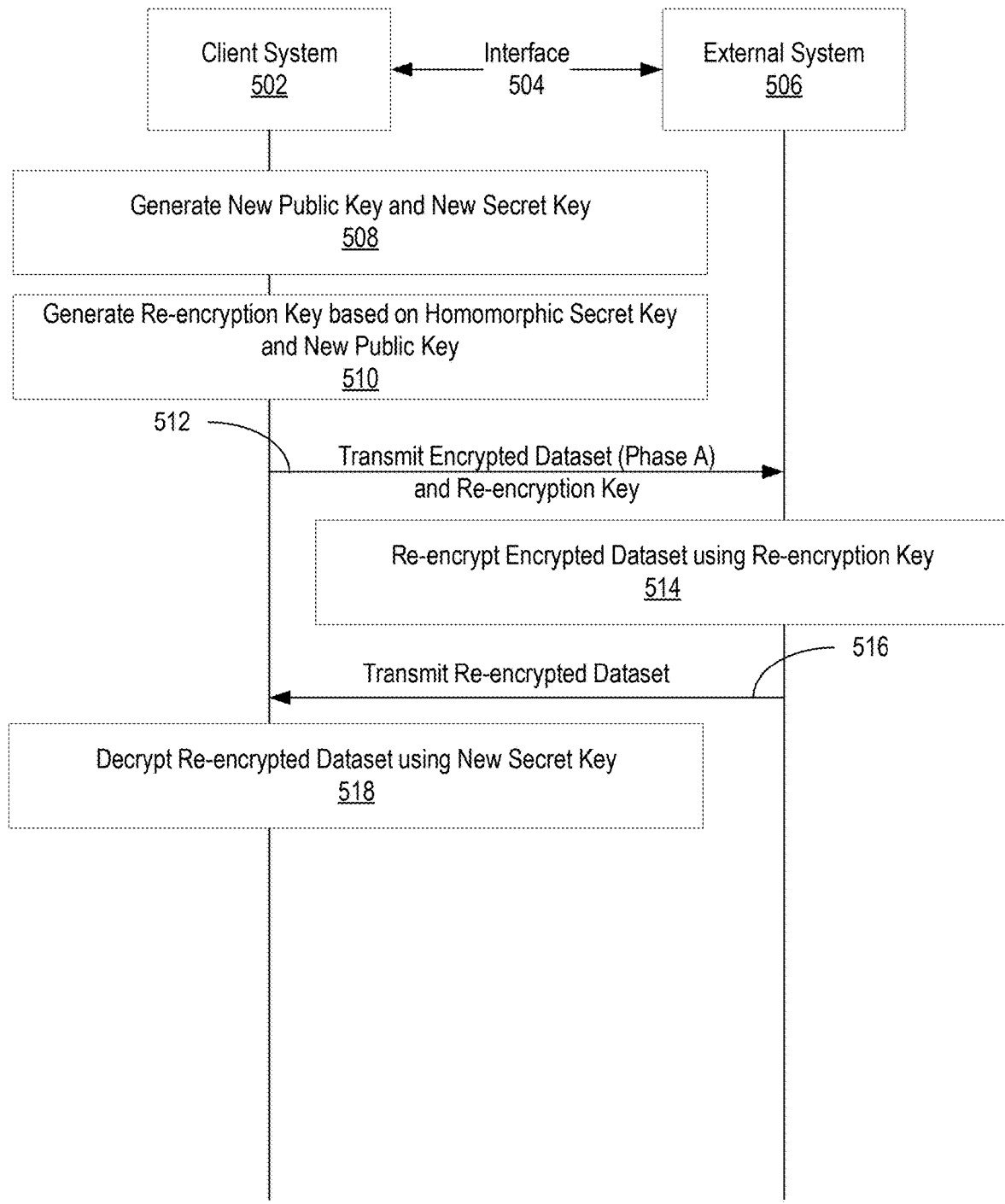
FIG. 5 depicts a homomorphic key rotation operation associated with the privacy-preserving authenticated key rotation.

FIG. 5 depicts a homomorphic key rotation operation associated with the privacy-preserving authenticated key rotation described herein. In particular, FIG. 5 depicts client system 502, comparable to client system 402 of FIG. 4.

At action 508, the client system 502 generates a new set of cryptographic keys, including a new public key and a new secret key that will be used to perform the key rotation on the data to the new set of cryptographic keys.

At action 510, the client system 502 also generates a re-encryption key based on the homomorphic secret key generated in the initialization operation depicted in FIG. 4 and the new public key.

At action 512, the client system 502 transmits the encrypted dataset that was generated during the initialization operation depicted in FIG. 4 and the re-encryption key to the external system 506.

At action 514, the external system 506 re-encrypts the encrypted dataset using the re-encryption key. Beneficially, the encrypted dataset can be directly encrypted using the re-encryption key without first decrypting the encrypted dataset. By re-encrypting the encrypted dataset in this manner, the plaintext data of the encrypted dataset is not exposed, thereby eliminating a cybersecurity vulnerability associated with existing key rotation processes.

At action 516, the external system 506 transmits the re-encrypted dataset to the client system 502. If needed, as shown by action 518, the client system 502 can then decrypt the re-encrypted dataset using the new secret key to generate the plaintext data. The client system 502 may only need to decrypt the re-encrypted dataset when a user needs to view the plaintext data, otherwise the data should remain encrypted to avoid cybersecurity issues.

Homomorphic MAC Verification

Figure 6:
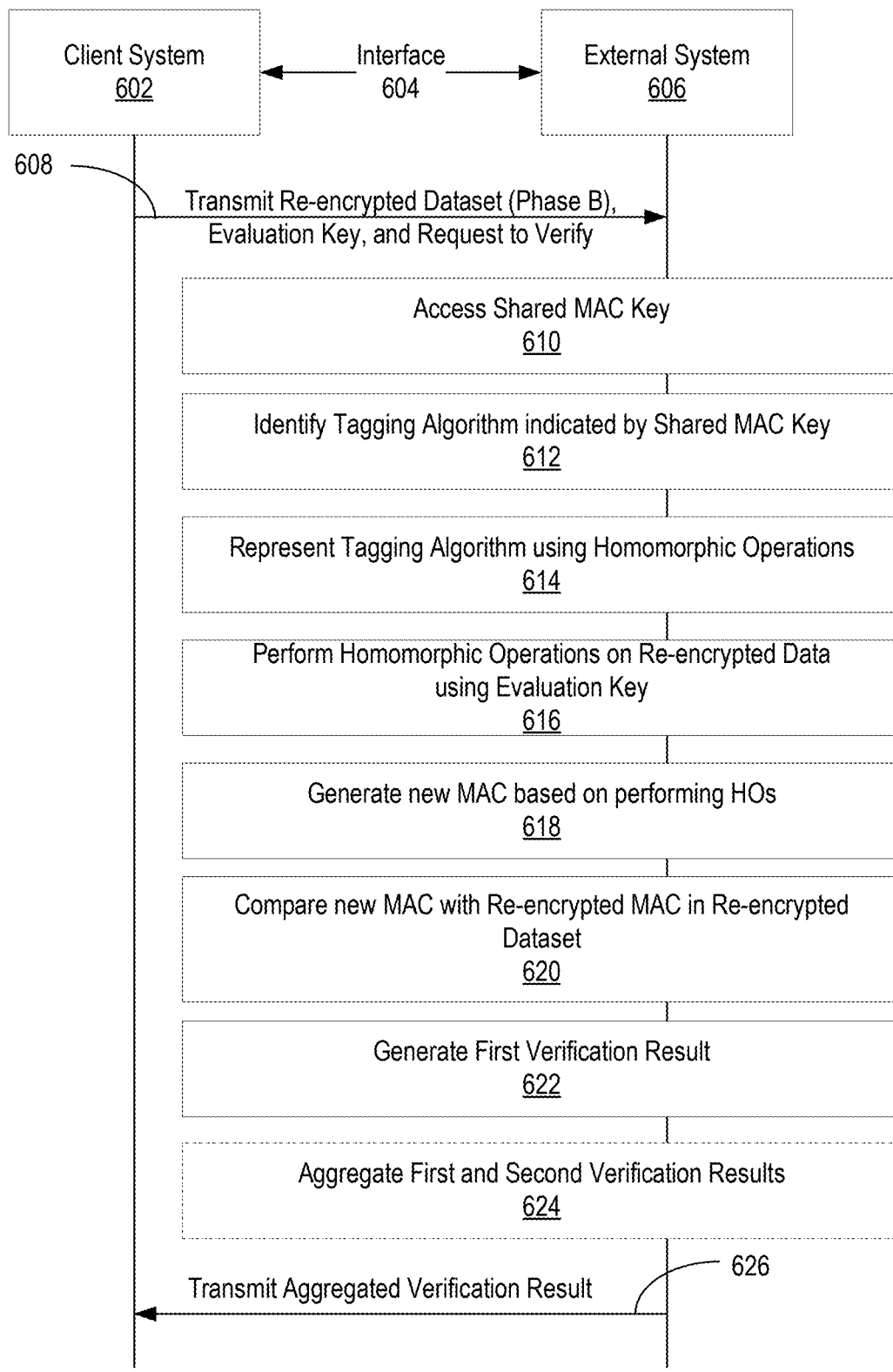
FIG. 6 depicts a homomorphic MAC verification operation associated with the privacy-preserving authenticated key rotation.

FIG. 6 depicts a homomorphic MAC verification operation associated with the privacy-preserving authenticated key rotation described herein. In particular, FIG. 6 depicts client system 602 in communication with a second external system, such as external system 606 via interface 604. In some aspects, client system 602 is comparable to client system 502 of FIG. 5, external system 606 is comparable to external system 506 of FIG. 5, and interface 604 is comparable to interface 504 of FIG. 5.

At action 608, client system 602 transmits the re-encrypted dataset and the evaluation key, which were both generated during the homomorphic key rotation operation depicted in FIG. 5. Client system 602 also generates and transmits a request to verify the re-encrypted dataset. In some aspects, the re-encrypted dataset may have been corrupted during the homomorphic key rotation operation, wherein aspects of the homomorphic MAC verification operation are utilized to verify whether the re-encrypted dataset is authentic or corrupted. As described above, in existing key rotation systems, there is no way to verify whether the data has become corrupted during the key rotation to the new key without decrypting the re-encrypted data, thus exposing the plaintext data. Accordingly, the homomorphic message authentication verification operation associated with the privacy-preserving authenticated key rotation described herein is able to perform a verification on the re-encrypted dataset without exposing the underlying plaintext data, thus constituting a technical improvement to the underlying technology of key rotation in encryption.

In particular, at action 610, external system 606 accesses the shared MAC key that was generated during the initialization operation depicted in FIG. 4.

External system 606 identifies the tagging algorithm indicated by the shared MAC key at action 612. The process for identifying the tagging algorithm is defined with respect to a specific set of encryption and MAC algorithms. This is part of the overall system architecture and is configured during an initial architecture design phase. The development of the system architecture is performed in order to implement the components associated with the encryption and MAC algorithms.

At action 614, external system 606 represents the tagging algorithm using one or more homomorphic operations. In some aspects, the tagging algorithm is configured as a MAC verification algorithm that generates a verification result given a key, message, and tag. The verification result may be a true or false (e.g., verified or failed state). If the message is encrypted, then the tagging algorithm as applied to an encrypted message outputs an encrypted verification result.

At action 616, external system 606 performs the one or more homomorphic operations on the re-encrypted data using the evaluation key.

Accordingly, at action 618, external system 606 is able to generate a new MAC based on performing the homomorphic operations on the re-encrypted dataset.

At action 620, external system 606 compares the new MAC with the re-encrypted MAC included in the re-encrypted dataset.

At action 622, external system 606 generates a first verification result and transmits the first verification result to client system 602. If the new MAC matches the re-encrypted MAC, then the first verification result indicates that the data is authentic and has not been corrupted during the homomorphic key rotation operation. If the new MAC does not match the re-encrypted MAC, then the first verification result indicates that the data is not authentic and may have been corrupted during the homomorphic key rotation operation. In some aspects, if the data is not authentic, the client system can tag the re-encrypted dataset with a tag that indicates that the data is not authentic. In some aspects, if the data is not authentic, the client system can identify a version of the re-encrypted dataset that is authentic and restore the authentic data that was stored, for example, at action 418 of FIG. 4.

In some aspects, the homomorphic message code verification operation is performed after each homomorphic key rotation operation and/or other security event, wherein actions 610-620 are repeated in order to generate a second verification result. In such aspects, the external system 606 is configured to aggregate the first and second verification results at action 624 and transmit the aggregated verification result at action 626. In some aspects, the first verification result and the second verification result are squared prior to aggregation. In this manner, if the either the first verification result or the second verification result is negative and the other is positive, by squaring both verification results, the external system 606 avoids a scenario in which the first verification result may cancel out the second verification result during aggregation. The client system 602 can then analyze the aggregated verification result and determine whether the data is authentic or may have been corrupted.

By performing a verification process in the manner MAC is described with respect to FIG. 6, the privacy-preserving authenticated key rotation process described herein beneficially provides a way to verify whether data is authentic after a key rotation is performed without exposing the underlying plaintext data to any external systems. This is because the key rotation and the verification operations are performed without having to decrypt the encrypted or the re-encrypted data.

Example Method for Privacy-Preserving Authenticated Homomorphic Key Rotation

Figure 7:
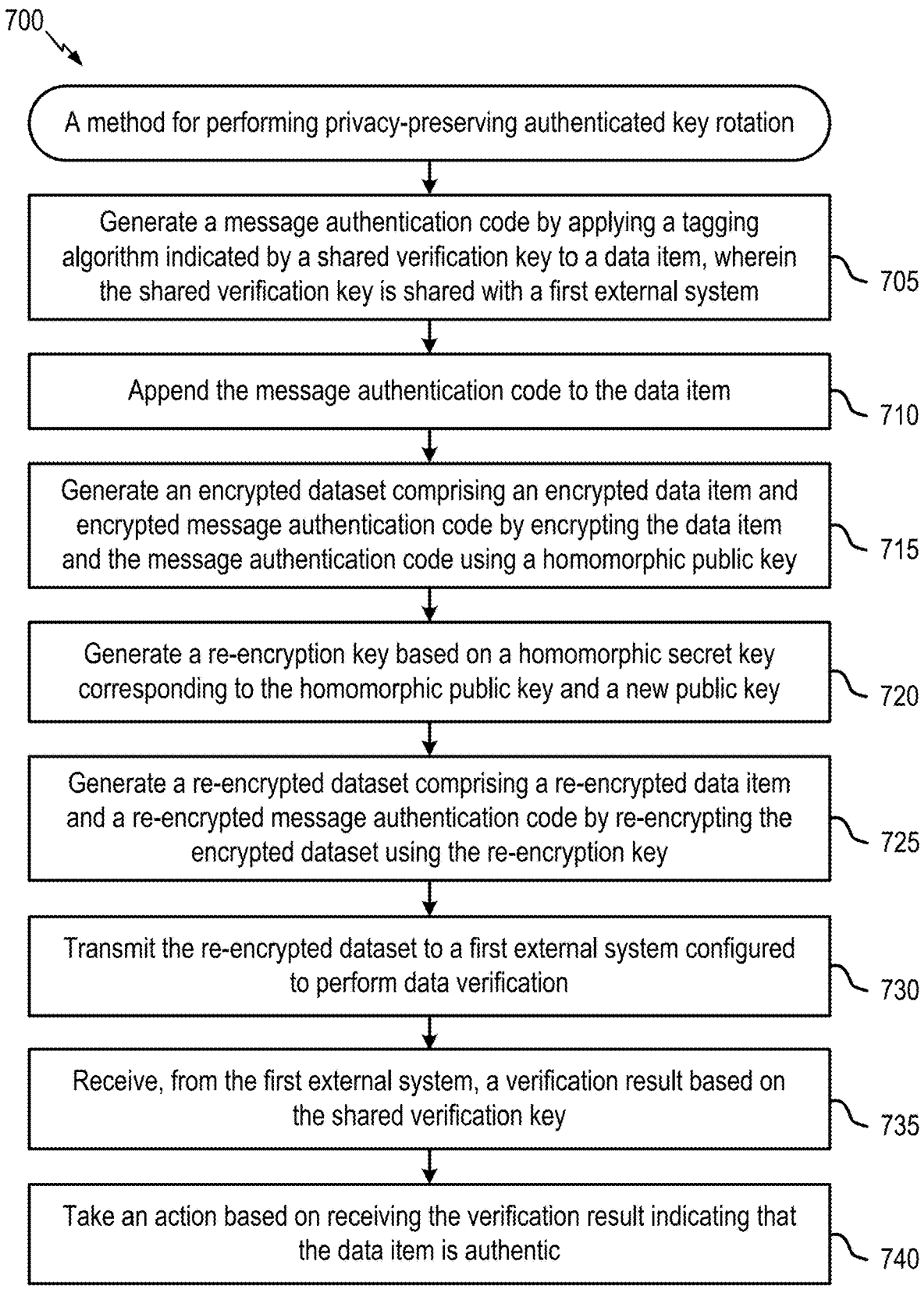
FIG. 7 depicts a method for performing data verification.

FIG. 7 depicts an example method 700 for performing privacy-preserving authenticated homomorphic key rotation. In one aspect, method 700 can be implemented by the processing system 1000 of FIG. 10.

Figure 10:
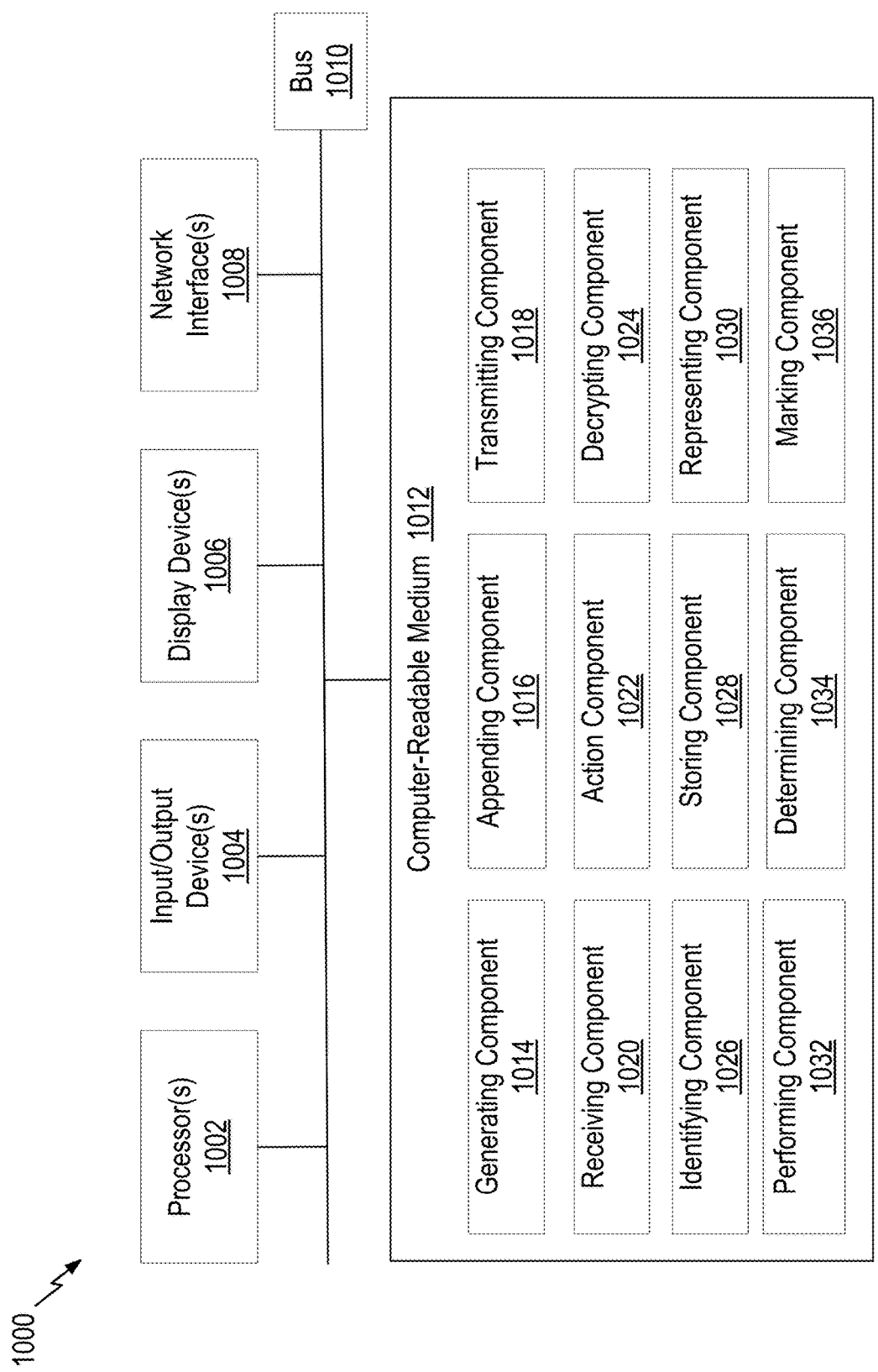
FIG. 10 depicts an example processing system with which aspects of the present disclosure can be performed.

Method 700 begins at block 705 with generating a MAC by applying a tagging algorithm indicated by a shared verification key to a data item, wherein the shared verification key is shared with a first external system. In some aspects, generating component 1014 of FIG. 10 is configured to generate a MAC by applying a tagging algorithm to the data item, as illustrated by action 412 of FIG. 4.

Method 700 then proceeds to block 710 with appending the MAC to the data item. In some aspects, appending component 1016 of FIG. 10 is configured to append the MAC to the data item, as illustrated by action 414 of FIG. 4.

Method 700 then proceeds to block 715 with generating an encrypted dataset comprising an encrypted data item and encrypted MAC by encrypting the data item and the MAC using a homomorphic public key. In some aspects, generating component 1014 of FIG. 10 is configured to generate an encrypted dataset by encrypting the data item and the message authentication key using the homomorphic public key, as illustrated by action 416 of FIG. 4.

Method 700 then proceeds to block 720 with generating a re-encryption key based on a homomorphic secret key corresponding to the homomorphic public key and a new public key. In some aspects, generating component 1014 of FIG. 10 is configured to generate a re-encryption key, as illustrated by action 510 of FIG. 5.

Method 700 then proceeds to block 725 with generating a re-encrypted dataset comprising a re-encrypted data item and a re-encrypted MAC by re-encrypting the encrypted dataset using the re-encryption key. In some aspects, generating component 1014 of FIG. 10 is configured to generate the re-encrypted dataset, for example, as illustrated by action 510 of FIG. 5.

Method 700 then proceeds to block 730 with transmitting the re-encrypted dataset to a first external system configured to perform data verification. In some aspects, transmitting component 1018 of FIG. 10 is configured to transmit the re-encrypted dataset to external system 606, for example, as illustrated by action 608 of FIG. 6.

Method 700 then proceeds to block 735 with receiving, from the first external system, a verification result based on the shared verification key. In some aspects, receiving component 1020 of FIG. 10 is configured to receive, for example, at client system 602 of FIG. 6, from external system 606 of FIG. 6, a verification result, for example, as illustrated by action 626 of FIG. 6. Notably, external system 606 of FIG. 6 may transmit the first verification result generated at action 622 of FIG. 6, prior to or instead of, an aggregated verification result.

Method 700 then proceeds to block 740 with taking an action based on receiving the verification result indicating that the data item is authentic. In some aspects, action component 1022 of FIG. 10 is configured to take an action based on receiving the verification results, for example, the verification result generated at action 622 of FIG. 6. In some aspects, the verification result is encrypted, such that the verification result needs to be decrypted in order to determine what action to take based on the verification result.

In some aspects, the verification result indicates that the data item is not authentic; and the action (e.g., block 740) comprises: identifying a corruption event associated with the data item at a time associated with the verification result; and restoring the data item with an uncorrupted version of the data item at the time associated with the verification result. In some aspects, identifying component 1026 of FIG. 10 is configured to identify a corruption event associated with the data item.

In some aspects, the verification result indicates that the data item is not authentic; and the action (e.g., block 740) comprises: identifying a corruption event associated with the data item at a time associated with the verification result; and mark the data item with a tag indicating that the data item not authentic. In some aspects, identifying component 1026 of FIG. 10 is configured to identify a corruption event, and marking component 1036 of FIG. 10 is configured to mark the data item with a tag.

In some aspects, the verification result indicates that the data item is authentic; and the action (e.g., block 740) comprises storing the re-encrypted data item. In some aspects, storing component 1028 of FIG. 10 is configured to store the re-encrypted data item.

In some aspects, the verification result indicates that the data item is authentic; and the action (e.g., block 740) comprises decrypting the re-encrypted data item using a new secret key corresponding to the new public key. In some aspects, decrypting component 1024 of FIG. 10 is configured to decrypt the re-encrypted data item, for example, as illustrated by action 518 of FIG. 5.

In some aspects, block 725 includes: transmitting the encrypted dataset and the re-encryption key to a second external system configured to perform key rotation; and receiving, from the second external system, a re-encrypted dataset comprising a re-encrypted data item and a re-encrypted MAC. In some aspects, transmitting component of FIG. 10 is configured to transmit the encrypted dataset and the re-encryption key to a second external system, such as external system 506, to perform key rotation, for example, as illustrated by action 512 of FIG. 5.

In some aspects, the first external system and the second external system are a same external system. For example, in some aspects, external system 506 of FIG. 5 and external system 606 of FIG. 6 are the same system. In some aspects, the client system, first external system, and second external system are the same system. In some aspects, the first external system and the second external system are systems that are a part of the same network as the client system.

Thus, aspects of method 700 described herein beneficially overcome technical problems associated with existing key rotation techniques, including providing a way to authenticate the data after a key rotation is performed, while also preventing cybersecurity vulnerabilities that arise during the exposure window between the decryption using the old key and the re-encryption using the new key. Aspects of method 700 overcome the technical problem of the inability of existing systems and methods to identify data corruption that may occur during the decryption or encryption processes themselves. Beneficially, method 700 allows for users and systems to authenticate data after it has undergone a key rotation, in order to verify that no corruption event, either by a third party, or by the internal system performing the key rotation, occurred with the data. Aspects of method 700 also overcome the technical problem of exposing plaintext data by existing systems by allowing for the key rotation and the data verification post-key rotation to be performed without decrypting the encrypted or re-encrypted data, thereby preventing exposure of the underlying plaintext data.

Note that FIG. 7 is just one example of a method, and other methods including fewer, additional, or alternative operations are possible consistent with this disclosure.

Example Method for Performing Homomorphic Key Rotation

Figure 8:
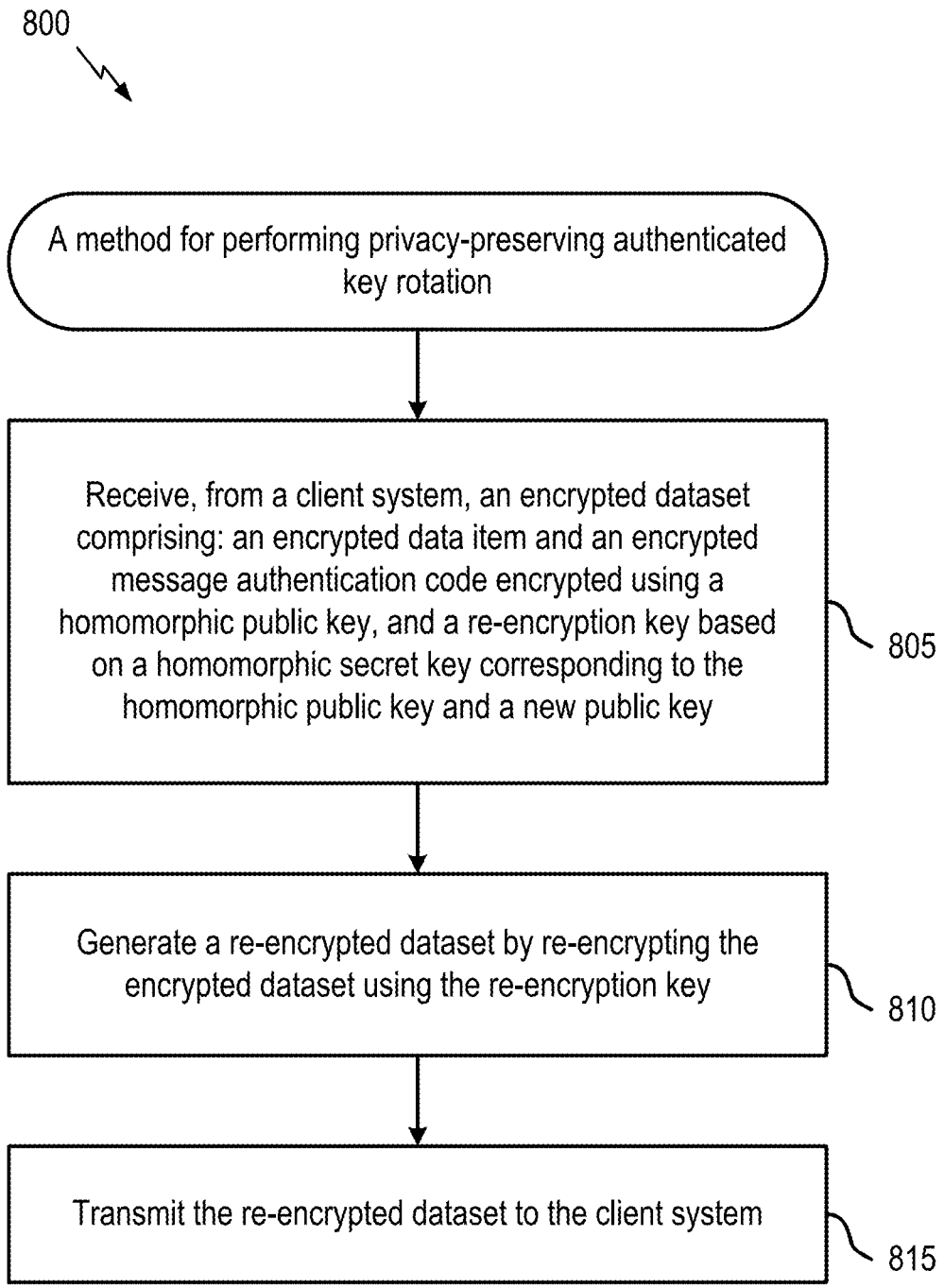
FIG. 8 depicts a method for performing homomorphic key rotation.

FIG. 8 depicts an example method 800 for performing homomorphic key rotation. In one aspect, method 800 can be implemented by the processing system 1000 of FIG. 10.

Method 800 begins at block 805 with receiving, from a client system, an encrypted dataset comprising an encrypted data item and an encrypted MAC encrypted using a homomorphic public key, and a re-encryption key based on a homomorphic secret key corresponding to the homomorphic public key and a new public key. In some aspects, receiving component 1020 of FIG. 10 is configured to receive, from client system 502 of FIG. 5, an encrypted dataset, for example, as illustrated by action 512 of FIG. 5.

Method 800 then proceeds to block 810 with generating a re-encrypted dataset by re-encrypting the encrypted dataset using the re-encryption key. In some aspects, generating component 1014 of FIG. 10 is configured to generate the re-encrypted dataset by re-encrypting the encrypted dataset, for example, as illustrated by action 514 of FIG. 5.

Method 800 then proceeds to block 815 with transmitting the re-encrypted dataset to the client system. In some aspects, transmitting component 1018 of FIG. 10 is configured to transmit the re-encrypted dataset to client system 502, for example, as illustrated by action 516 of FIG. 5.

Thus, method 800 beneficially overcomes technical problems associated with existing key rotation techniques, including providing a way to authenticate the data after a key rotation is performed, while also preventing cybersecurity vulnerabilities that arise during the exposure window between the decryption using the old key and the re-encryption using the new key. For example, aspects of method 800 overcome the technical problem of the inability of existing systems and methods and the technical problem of exposing plaintext data. Beneficially, method 800 allow for users and systems to authenticate data after it has undergone a key rotation, in order to verify that no corruption event, either by a third party, or by the internal system performing the key rotation, occurred with the data without decrypting any encrypted data.

Note that FIG. 8 is just one example of a method, and other methods including fewer, additional, or alternative operations are possible consistent with this disclosure.

Example Method for Homomorphic MAC Verification

Figure 9:
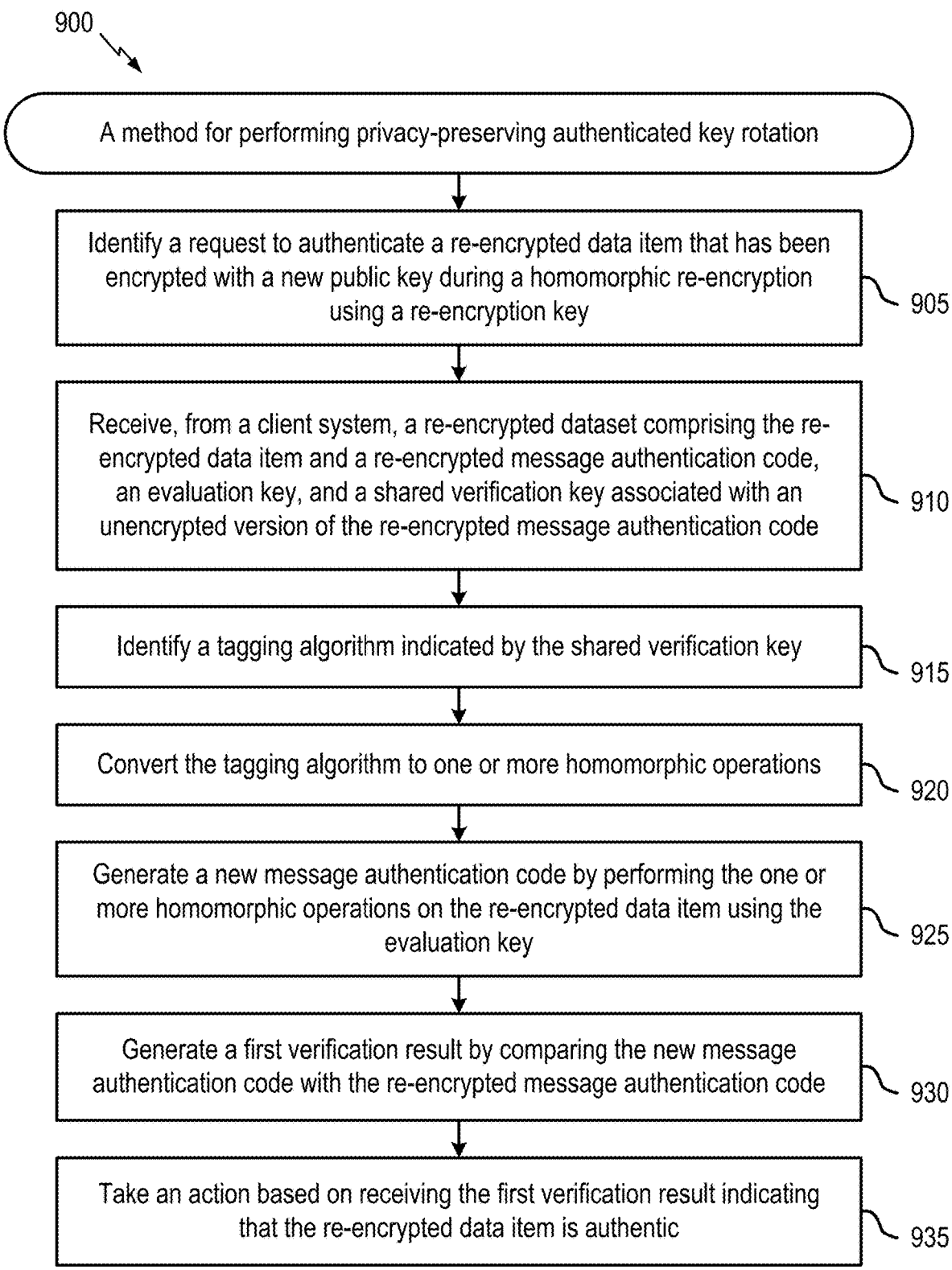
FIG. 9 depicts a method for performing homomorphic MAC verification.

FIG. 9 depicts an example method 900 for homomorphic MAC verification. In one aspect, method 900 can be implemented by the processing system 1000 of FIG. 10.

Method 900 begins at block 905 with identifying a request to authenticate a re-encrypted data item that has been encrypted with a new public key during a homomorphic re-encryption using a re-encryption key. In some aspects, identifying component 1026 of FIG. 10 is configured to identify a request to authenticate a re-encrypted data item.

Method 900 then proceeds to block 910 with receiving, from a client system, a re-encrypted dataset comprising the re-encrypted data item and a re-encrypted MAC, an evaluation key, and a shared verification key associated with an unencrypted version of the re-encrypted MAC. In some aspects, receiving component 1020 of FIG. 10 is configured to receive, from client system 602, a re-encrypted dataset, an evaluation key, and a shared verification key, for example, as illustrated by action 608 of FIG. 6.

Method 900 then proceeds to block 915 with identifying a tagging algorithm indicated by the shared verification key. In some aspects, identifying component 1026 of FIG. 10 is configured to identify a tagging algorithm indicated by the shared verification key, for example, as illustrated by action 612 of FIG. 6.

Method 900 then proceeds to block 920 with representing the tagging algorithm to one or more homomorphic operations. In some aspects, representing component 1030 of FIG. 10 is configured to represent the tagging algorithm using homomorphic operations, for example, as illustrated by action 614 of FIG. 6.

Method 900 then proceeds to block 925 with generating a new MAC by performing the one or more homomorphic operations on the re-encrypted data item using the evaluation key. In some aspects, generating component 1014 of FIG. 10 is configured to generate a new MAC, for example, as illustrated by action 618 of FIG. 6. In some aspects, the new MAC is encrypted.

Method 900 then proceeds to block 930 with generating a first verification result by comparing the new MAC with the re-encrypted MAC. In some aspects, generating component 1014 of FIG. 10 is configured to generate a first verification result, for example, as illustrated by action 622 of FIG. 6. In some aspects, the first verification result is encrypted.

Method 900 then proceeds to block 935 with taking an action based on receiving the first verification result indicating that the re-encrypted data item is authentic. In some aspects, action component 1022 is configured to take an action based on receiving the first verification result.

In some aspects, block 905 includes receiving the request from an external system. In some aspects, receiving component 1020 of FIG. 10 is configured to receive a request from an external system, such as external system 506 of FIG. 5 and/or external system 606 of FIG. 6.

In some aspects, the first verification result indicates that the re-encrypted data item is not authentic and the action (e.g., block 935) comprises decrypting the first verification result; identifying a corruption event associated with the re-encrypted data item at a time associated with the first verification result; and restoring the re-encrypted data item with an uncorrupted version of the re-encrypted data item at the time associated with the first verification result. In some aspects, decrypting component 1024 of FIG. 10 is configured to decrypt the first verification result.

In some aspects, the first verification result indicates that the re-encrypted data item is authentic and the action (e.g., block 935) comprises decrypting the re-encrypted data item using a new secret key corresponding to the new public key. In some aspects, decrypting component 1024 of FIG. 10 is configured to decrypt the re-encrypted data item.

In some aspects, method 900 further includes receiving a second request to verify the re-encrypted data item. In some aspects, receiving component 1020 of FIG. 10 is configured to receive a second request to verify the re-encrypted data item.

In some aspects, method 900 further includes performing a second homomorphic MAC verification. In some aspects, performing component 1032 of FIG. 10 is configured to perform a second homomorphic MAC verification.

In some aspects, method 900 further includes generating a second verification result based on performing the homomorphic MAC verification. In some aspects, generating component 1014 of FIG. 10 is configured to generate a second verification result.

In some aspects, method 900 further includes generating an aggregated result by aggregating the first verification result and the second verification result. In some aspects, generating component 1014 of FIG. 10 is configured to generate an aggregated result, for example, as illustrated by action 624 of FIG. 6.

In some aspects, method 900 further includes determining that the re-encrypted data item is not verified based on the aggregated result. In some aspects, determining component 1034 of FIG. 10 is configured to determine that the re-encrypted data item is not verified based on the aggregated result.

In some aspects, method 900 further includes decrypting the aggregated result using a new private key corresponding to the new public key. In some aspects, decrypting component 1024 of FIG. 10 is configured to decrypt the aggregated result using a new private key corresponding to the new public key.

In some aspects, method 900 further includes identifying a corruption event associated with the re-encrypted data item occurring between generating the first verification result and generating the second verification result based on decrypting the aggregated result. In some aspects, identifying component 1026 of FIG. 10 is configured to identify a corruption event associated with the re-encrypted data item.

In some aspects, generating the aggregated result further comprises squaring the first verification result and the second verification result prior to aggregating the first verification result and the second verification result.

In some aspects, the homomorphic MAC verification corresponds to a Brakerski-Gentry-Vaikuntanathan (BGV) encryption scheme.

In some aspects, the homomorphic MAC verification corresponds to a Brakerski Fan-Vercauteren (BFV) encryption scheme.

In some aspects, the re-encryption key corresponds to a number domain associated with modulo p, where p is a prime number.

In some aspects, method 900 further includes performing a key rotation, from an old public key to a new public key, for an encrypted data item by re-encrypting, using the re-encryption key based on the new public key and an old secret key corresponding to the old public key, an encrypted dataset comprising the encrypted data item and an encrypted MAC based on a shared authentication key and the encrypted data item, wherein the encrypted dataset is associated with the old secret key and the old public key, and the re-encrypted dataset can be decrypted with a new secret key corresponding to the new public key. In some aspects, performing component 1032 of FIG. 10 is configured to perform a key rotation, such as homomorphic key rotation depicted in FIG. 5.

Thus, method 900 beneficially overcomes technical problems associated with existing key rotation techniques. For example, method 900 provides a way to authenticate the data after a key rotation is performed and prevent cybersecurity vulnerabilities that arise during the exposure window between the decryption using the old key and the re-encryption using the new key. Method 900 also overcomes the technical problem of exposing plaintext data by existing systems by allowing for the key rotation and the data verification post-key rotation to be performed without decrypting the encrypted or re-encrypted data, thereby preventing exposure of the underlying plaintext data.

Note that FIG. 9 is just one example of a method, and other methods including fewer, additional, or alternative operations are possible consistent with this disclosure.

Example Processing System

FIG. 10 depicts an example processing system 1000 configured to perform various aspects described herein, including, for example, method 700 as described above with respect to FIG. 7, method 800 as described above with respect to FIG. 8, and/or method 900 as described above with respect to FIG. 9.

Processing system 1000 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 1000 includes one or more processor(s) 1002, one or more input/output device(s) 1004, one or more display device(s) 1006, one or more network interface(s) 1008 through which processing system 1000 is connected to one or more networks (e.g., a local network, an intranet, the Internet, or any other group of processing systems communicatively connected to each other), and computer-readable medium 1012. In the depicted example, the aforementioned components are coupled by a bus 1010, which may generally be configured for data exchange amongst the components. Bus 1010 may be representative of multiple buses, while only one is depicted for simplicity.

Processor(s) 1002 are generally configured to retrieve and execute instructions stored in one or more memories, including local memories like computer-readable medium 1012, as well as remote memories and data stores. Similarly, processor(s) 1002 are configured to store application data residing in local memories like the computer-readable medium 1012, as well as remote memories and data stores. More generally, bus 1010 is configured to transmit programming instructions and application data among the processor(s) 1002, display device(s) 1006, network interface(s) 1008, and/or computer-readable medium 1012. In certain embodiments, processor(s) 1002 are representative of one or more central processing units (CPUs), graphics processing unit (GPUs), tensor processing unit (TPUs), accelerators, and other processing devices.

Input/output device(s) 1004 may include any device, mechanism, system, interactive display, and/or various other hardware and software components for communicating information between processing system 1000 and a user of processing system 1000. For example, input/output device(s) 1004 may include input hardware, such as a keyboard, touch screen, button, microphone, speaker, and/or other device for receiving inputs from the user and sending outputs to the user.

Display device(s) 1006 may generally include any sort of device configured to display data, information, graphics, user interface elements, and the like to a user. For example, display device(s) 1006 may include internal and external displays such as an internal display of a tablet computer or an external display for a server computer or a projector. Display device(s) 1006 may further include displays for devices, such as augmented, virtual, and/or extended reality devices. In various embodiments, display device(s) 1006 may be configured to display a graphical user interface.

Network interface(s) 1008 provide processing system 1000 with access to external networks and thereby to external processing systems. Network interface(s) 1008 can generally be any hardware and/or software capable of transmitting and/or receiving data via a wired or wireless network connection. Accordingly, network interface(s) 1008 can include a communication transceiver for sending and/or receiving any wired and/or wireless communication.

Computer-readable medium 1012 may be a volatile memory, such as a random-access memory (RAM), or a nonvolatile memory, such as nonvolatile random-access memory (NVRAM), or the like. In this example, computer-readable medium 1012 includes generating component 1014, appending component 1016, transmitting component 1018, receiving component 1020, action component 1022, decrypting component 1024, identifying component 1026, storing (and restoring) component 1028, representing component 1030, performing component 1032, determining component 1034, and marking component 1036. Processing of the components 1014-1036 may enable and cause the processing system 1000 to perform: the method 700 described with respect to FIG. 7, or any aspect related to it; the method 800 described with respect to FIG. 8, or any aspect related to it; and/or the method 900 described with respect to FIG. 9, or any aspect related to it.

In certain embodiments, generating component 1014 is configured to generate a MAC by applying a tagging algorithm indicated by a shared verification key to a data item, wherein the shared verification key is shared with a first external system, as described in FIG. 7 with reference to block 705. In certain embodiments, appending component 1016 is configured to append the MAC to the data item, as described in FIG. 7 with reference to block 710. In certain embodiments, generating component 1014 is configured to generate an encrypted dataset comprising an encrypted data item and encrypted MAC by encrypting the data item and the MAC using a homomorphic public key, as described in FIG. 7 with reference to block 715. In certain embodiments, generating component 1014 is configured to generate a re-encryption key based on a homomorphic secret key corresponding to the homomorphic public key and a new public key, as described in FIG. 7 with reference to block 720. In certain embodiments, generating component 1014 is configured to generate a re-encrypted dataset comprising a re-encrypted data item and a re-encrypted MAC by re-encrypting the encrypted dataset using the re-encryption key, as described in FIG. 7 with reference to block 725. In certain embodiments, transmitting component 1018 is configured to transmit the re-encrypted dataset to a first external system configured to perform data verification, as described in FIG. 7 with reference to block 730. In certain embodiments, receiving component 1020 is configured to receive, from the first external system, a verification result based on the shared verification key, as described in FIG. 7 with reference to block 735. In certain embodiments, action component 1022 is configured to take an action based on receiving the verification result indicating that the data item is authentic, as described in FIG. 7 with reference to block 740.

In certain embodiments, receiving component 1020 is configured to receive, from a client system, an encrypted dataset comprising: an encrypted data item and an encrypted MAC encrypted using a homomorphic public key; and a re-encryption key based on a homomorphic secret key corresponding to the homomorphic public key and a new public key, as described in FIG. 8 with reference to block 805. In certain embodiments, generating component 1014 is configured to generate a re-encrypted dataset by re-encrypting the encrypted dataset using the re-encryption key, as described in FIG. 8 with reference to block 810. In certain embodiments, transmitting component 1018 is configured to transmit the re-encrypted dataset to the client system, as described in FIG. 8 with reference to block 815.

In certain embodiments, identifying component 1026 is configured to identify a request to authenticate a re-encrypted data item that has been encrypted with a new public key during a homomorphic re-encryption using a re-encryption key, as described in FIG. 9 with reference to block 905. In certain embodiments, receiving component 1020 is configured to receive, from a client system, a re-encrypted dataset comprising the re-encrypted data item and a re-encrypted MAC, an evaluation key, and a shared verification key associated with an unencrypted version of the re-encrypted MAC, as described in FIG. 9 with reference to block 910. In certain embodiments, identifying component 1026 is configured to identify a tagging algorithm indicated by the shared verification key, as described in FIG. 9 with reference to block 915. In certain embodiments, representing component 1030 is configured to represent the tagging algorithm to one or more homomorphic operations, as described in FIG. 9 with reference to block 920. In certain embodiments, generating component 1014 is configured to generate a new MAC by performing the one or more homomorphic operations on the re-encrypted data item using the evaluation key, as described in FIG. 9 with reference to block 925. In certain embodiments, generating component 1014 is configured to generate a first verification result by comparing the new MAC with the re-encrypted MAC, as described in FIG. 9 with reference to block 930. In certain embodiments, action component 1022 is configured to take an action based on receiving the first verification result indicating that the re-encrypted data item is authentic, as described in FIG. 9 with reference to block 935.

Note that FIG. 10 is just one example of a processing system consistent with aspects described herein, and other processing systems having additional, alternative, or fewer components are possible consistent with this disclosure.

Example Clauses

Implementation examples are described in the following numbered clauses:

Clause 1: A method for performing data verification, comprising: generating a MAC by applying a tagging algorithm indicated by a shared verification key to a data item, wherein the shared verification key is shared with a first external system; appending the MAC to the data item; generating an encrypted dataset comprising an encrypted data item and encrypted MAC by encrypting the data item and the MAC using a homomorphic public key; generating a re-encryption key based on a homomorphic secret key corresponding to the homomorphic public key and a new public key; generating a re-encrypted dataset comprising a re-encrypted data item and a re-encrypted MAC by re-encrypting the encrypted dataset using the re-encryption key; transmitting the re-encrypted dataset to a first external system configured to perform data verification; receiving, from the first external system, a verification result based on the shared verification key; and taking an action based on receiving the verification result indicating that the data item is authentic.

Clause 2: The method of Clause 1, wherein: the verification result indicates that the data item is not authentic; and the action comprises: identifying a corruption event associated with the data item at a time associated with the verification result; and restore the data item with an uncorrupted version of the data item at the time associated with the verification result.

Clause 3: The method of any one of Clauses 1-2, wherein: the verification result indicates that the data item is not authentic; and the action comprises: identifying a corruption event associated with the data item at a time associated with the verification result; and mark the data item with a tag indicating that the data item not authentic.

Clause 4: The method of any one of Clauses 1-3, wherein: the verification result indicates that the data item is authentic; and the action comprises storing the re-encrypted data item.

Clause 5: The method of any one of Clauses 1-4, wherein: the verification result indicates that the data item is authentic; and the action comprises decrypting the re-encrypted data item using a new secret key corresponding to the new public key.

Clause 6: The method of any one of Clauses 1-5, wherein generating the re-encrypted dataset comprising the re-encrypted data item and the re-encrypted MAC by re-encrypting the encrypted dataset using the re-encryption key comprises: transmitting the encrypted dataset and the re-encryption key to a second external system configured to perform key rotation; and receiving, from the second external system, the re-encrypted dataset comprising the re-encrypted data item and the re-encrypted MAC.

Clause 7: The method of Clause 6, wherein the first external system and the second external system are a same external system.

Clause 8: A method for performing homomorphic key rotation, comprising: receiving, from a client system, an encrypted dataset comprising: an encrypted data item and an encrypted MAC encrypted using a homomorphic public key, and a re-encryption key based on a homomorphic secret key corresponding to the homomorphic public key and a new public key; generating a re-encrypted dataset by re-encrypting the encrypted dataset using the re-encryption key; and transmitting the re-encrypted dataset to the client system.

Clause 9: A method for performing homomorphic MAC verification, comprising: identifying a request to authenticate a re-encrypted data item that has been encrypted with a new public key during a homomorphic re-encryption using a re-encryption key; receiving, from a client system, a re-encrypted dataset comprising the re-encrypted data item and a re-encrypted MAC, an evaluation key, and a shared verification key associated with an unencrypted version of the re-encrypted MAC; identifying a tagging algorithm indicated by the shared verification key; representing the tagging algorithm to one or more homomorphic operations; generating a new MAC by performing the one or more homomorphic operations on the re-encrypted data item using the evaluation key; generating a first verification result by comparing the new MAC with the re-encrypted MAC; and taking an action based on receiving the first verification result indicating that the re-encrypted data item is authentic.

Clause 10: The method of Clause 9, wherein identifying the request to authenticate the re-encrypted data item further comprises receiving the request from an external system.

Clause 11: The method of any one of Clauses 9-10, wherein: the first verification result indicates that the re-encrypted data item is not authentic; and the action comprises: decrypting the first verification result; identifying a corruption event associated with the re-encrypted data item at a time associated with the first verification result; and restore the re-encrypted data item with an uncorrupted version of the re-encrypted data item at the time associated with the first verification result.

Clause 12: The method of any one of Clauses 9-11, wherein: the first verification result indicates that the re-encrypted data item is authentic; and the action comprises decrypting the re-encrypted data item using a new secret key corresponding to the new public key.

Clause 13: The method of any one of Clauses 9-12, further comprising: receiving a second request to verify the re-encrypted data item; performing a second homomorphic MAC verification; generating a second verification result based on performing the homomorphic MAC verification; and generating an aggregated result by aggregating the first verification result and the second verification result.

Clause 14: The method of Clause 13, further comprising determining that the re-encrypted data item is not verified based on the aggregated result.

Clause 15: The method of Clause 13, further comprising: decrypting the aggregated result using a new private key corresponding to the new public key; and identifying a corruption event associated with the re-encrypted data item occurring between generating the first verification result and generating the second verification result based on decrypting the aggregated result.

Clause 16: The method of Clause 13, wherein generating an aggregated result further comprises squaring the first verification result and the second verification result prior to aggregating the first verification result and the second verification result.

Clause 17: The method of any one of Clauses 9-16, wherein the homomorphic MAC verification corresponds to a Brakerski-Gentry-Vaikuntanathan (BGV) encryption scheme.

Clause 18: The method of any one of Clauses 9-17, wherein the homomorphic MAC verification corresponds to a Brakerski Fan-Vercauteren (BFV) encryption scheme.

Clause 19: The method of any one of Clauses 9-18, wherein the re-encryption key corresponds to a number domain associated with modulo p, where p is a prime number.

Clause 20: The method of any one of Clauses 9-19, further comprising: performing a key rotation, from an old public key to a new public key, for an encrypted data item by re-encrypting, using the re-encryption key based on the new public key and an old secret key corresponding to the old public key, an encrypted dataset comprising the encrypted data item and an encrypted MAC based on a shared authentication key and the encrypted data item, wherein: the encrypted dataset is associated with the old secret key and the old public key, and the re-encrypted dataset can be decrypted with a new secret key corresponding to the new public key.

Clause 21: The method of any one of Clauses 9-19, wherein the new MAC is encrypted, and the first verification result is encrypted.

Clause 22: A processing system, comprising: memory comprising computer-executable instructions; and one or more processors configured to execute the computer-executable instructions and cause the processing system to perform a method in accordance with any one of Clauses 1-21.

Clause 23: A processing system, comprising means for performing a method in accordance with any one of Clauses 1-21.

Clause 24: A non-transitory computer-readable medium storing program code for causing a processing system to perform the steps of any one of Clauses 1-21.

Clause 25: A computer program product embodied on a computer-readable storage medium comprising code for performing a method in accordance with any one of Clauses 1-21.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method that is practiced using other structure, functionality, structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

Generally, where there are operations illustrated in figures, those operations may have corresponding counterpart means-plus-function components with similar numbering.

The following claims are not intended to be limited to the embodiments shown herein but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for performing data verification, comprising:
generating a message authentication code (MAC) by applying a tagging algorithm indicated by a shared verification key to a data item, wherein the shared verification key is shared with a first external system;
appending the MAC to the data item;
generating an encrypted dataset comprising an encrypted data item and encrypted MAC by encrypting the data item and the MAC using a homomorphic public key;
generating a re-encryption key based on a homomorphic secret key corresponding to the homomorphic public key and a new public key;
generating a re-encrypted dataset comprising a re-encrypted data item and a re-encrypted MAC by re-encrypting the encrypted dataset using the re-encryption key;
transmitting the re-encrypted dataset to the first external system configured to perform data verification;
receiving, from the first external system, a verification result based on the shared verification key; and
taking an action based on receiving the verification result.

2. The method of claim 1, wherein:
the verification result indicates that the data item is not authentic; and
the action comprises:
identifying a corruption event associated with the data item at a time associated with the verification result; and
restoring the data item with an uncorrupted version of the data item at the time associated with the verification result.

3. The method of claim 1, wherein:
the verification result indicates that the data item is not authentic; and
the action comprises:
identifying a corruption event associated with the data item at a time associated with the verification result; and
marking the data item with a tag indicating that the data item is not authentic.

4. The method of claim 1, wherein:
the verification result indicates that the data item is authentic; and
the action comprises storing the re-encrypted data item.

5. The method of claim 1, wherein:
the verification result indicates that the data item is authentic; and
the action comprises decrypting the re-encrypted data item using a new secret key corresponding to the new public key.

6. The method of claim 1, wherein generating the re-encrypted dataset comprising the re-encrypted data item and the re-encrypted MAC by re-encrypting the encrypted dataset using the re-encryption key comprises:
transmitting the encrypted dataset and the re-encryption key to a second external system configured to perform key rotation; and
receiving, from the second external system, the re-encrypted dataset comprising the re-encrypted data item and the re-encrypted MAC.

7. The method of claim 6, wherein the first external system and the second external system are a same external system.

8. A method for performing homomorphic message authentication code (MAC) verification, comprising:
identifying a request to authenticate a re-encrypted data item that has been encrypted with a new public key during a homomorphic re-encryption using a re-encryption key;
receiving, from a client system, a re-encrypted dataset comprising the re-encrypted data item and a re-encrypted MAC, an evaluation key, and a shared verification key associated with an unencrypted version of the re-encrypted MAC;
identifying a tagging algorithm indicated by the shared verification key;
representing the tagging algorithm to one or more homomorphic operations;
generating a new MAC by performing the one or more homomorphic operations on the re-encrypted data item using the evaluation key;
generating a first verification result by comparing the new MAC with the re-encrypted MAC, wherein the new MAC is encrypted, and the first verification result is encrypted; and
taking an action based on receiving the first verification result.

9. The method of claim 8, wherein identifying the request to authenticate the re-encrypted data item further comprises receiving the request from an external system.

10. The method of claim 8, wherein:
the first verification result indicates that the re-encrypted data item is not authentic; and
the action comprises:
decrypting the first verification result;
identifying a corruption event associated with the re-encrypted data item at a time associated with the first verification result; and
restoring the re-encrypted data item with an uncorrupted version of the re-encrypted data item at the time associated with the first verification result.

11. The method of claim 8, wherein:
the first verification result indicates that the re-encrypted data item is authentic; and
the action comprises decrypting the re-encrypted data item using a new secret key corresponding to the new public key.

12. The method of claim 8, further comprising:
receiving a second request to verify the re-encrypted data item;
performing a second homomorphic MAC verification;
generating a second verification result based on performing the homomorphic MAC verification; and
generating an aggregated result by aggregating the first verification result and the second verification result.

13. The method of claim 12, further comprising determining that the re-encrypted data item is not verified based on the aggregated result.

14. The method of claim 12, further comprising:
decrypting the aggregated result using a new private key corresponding to the new public key; and
identifying a corruption event associated with the re-encrypted data item occurring between generating the first verification result and generating the second verification result based on decrypting the aggregated result.

15. The method of claim 12, wherein generating an aggregated result further comprises squaring the first verification result and the second verification result prior to aggregating the first verification result and the second verification result.

16. The method of claim 8, wherein the homomorphic MAC verification corresponds to a Brakerski-Gentry-Vaikuntanathan (BGV) encryption scheme.

17. The method of claim 8, wherein the homomorphic MAC verification corresponds to a Brakerski Fan-Vercauteren (BFV) encryption scheme.

18. The method of claim 8, wherein the re-encryption key corresponds to a number domain associated with modulo p, where p is a prime number.

19. The method of claim 8, further comprising:
performing a key rotation, from an old public key to a new public key, for an encrypted data item by re-encrypting, using the re-encryption key based on the new public key and an old secret key corresponding to the old public key, an encrypted dataset comprising the encrypted data item and an encrypted MAC based on a shared authentication key and the encrypted data item, wherein:
the encrypted dataset is associated with the old secret key and the old public key, and
the re-encrypted dataset can be decrypted with a new secret key corresponding to the new public key.

* * * * *